United States Patent [19]
Sadashivaiah

[11] Patent Number: 5,638,541
[45] Date of Patent: Jun. 10, 1997

[54] SYSTEM AND METHOD FOR MANAGING POWER ON DESKTOP SYSTEMS

[75] Inventor: Shivaprasad Sadashivaiah, Beaverton, Oreg.

[73] Assignee: Intel Corporation, Santa Clara, Calif.

[21] Appl. No.: 519,502

[22] Filed: Aug. 25, 1995

[51] Int. Cl.⁶ .................................................. G06F 1/32
[52] U.S. Cl. ................................ 395/750; 395/308
[58] Field of Search ............................... 395/750, 306, 395/308, 309

[56] References Cited

U.S. PATENT DOCUMENTS

| | | | |
|---|---|---|---|
| 5,504,910 | 4/1996 | Wisor et al. | 395/750 |
| 5,548,763 | 8/1996 | Combs et al. | 395/750 |
| 5,560,022 | 9/1996 | Dunstan et al. | 395/750 |
| 5,560,023 | 9/1996 | Crump et al. | 395/750 |

Primary Examiner—Glenn A. Auve
Attorney, Agent, or Firm—Blakely, Sokoloff, Taylor & Zafman

[57] ABSTRACT

A Power Management driver employed within an APM system of a computer system including an operating system driver ("APM driver") and a Basic Input/Output System ("APM BIOS"). The Power Management driver, operating in conjunction with the operating system, intercepts APM messages intended to be transferred from the APM driver to the APM BIOS in order to reduce power applied to a plurality of power manageable hardware devices. After intercepting the APM message and determining that power manageable hardware devices are ready to be powered-down, the Power Management driver issues a number of APM messages to the APM BIOS to sequentially power-down the power manageable hardware devices instead of just acknowledging a previously transmitted APM message from the APM BIOS. This allows the CPU to service network interrupt queries and time scheduled events.

18 Claims, 7 Drawing Sheets

SYSTEM AND METHOD FOR MANAGING POWER ON DESKTOP SYSTEMS

BACKGROUND OF THE INVENTION

1. Field of the Invention

The present invention relates to the field of power management. More specifically, this invention relates to a system architecture and method for reducing power consumption of a computer system, in particular desktop personal computers.

2. Description of Art Related to the Invention

Over the last decade, there have been many advances in semiconductor technology which have lead to the development of faster, more powerful semiconductor devices. These advanced semiconductor devices have resulted in the creation of faster and more sophisticated computer systems having greater capabilities and supporting more advanced peripheral devices. These sophisticated computer systems, however, have a tendency of consuming greater amounts of power.

To reduce power consumption, the industry has concentrated its efforts on developing a system which performs power-down techniques on selected hardware devices when the computer system is not being used after a predetermined period of time. Examples of the power-down techniques include, but are not limited to, deactivating one or both of the horizontal and vertical sync signals transmitted into a display monitor, decreasing the rotational frequency of a hard drive and prompting a central processing unit ("CPU") to enter into a System Management Mode ("SMM"). SMM is a well-known operating mode which allows high level systems functions, such as power management or security, to be transparent not only to application software but also to operating systems. As a result of these efforts, a conventional Advanced Power Management ("APM") system was developed as shown in FIG. 1.

In FIG. 1, the conventional APM system 100 consists of one or more layers of software which are collectively used to provide power management for a computer system having hardware devices whose power levels could be easily managed (hereinafter referred to as "power manageable hardware devices"). More specifically, the conventional APM system 100 comprises a hardware-independent software interface ("APM interface") 120 through which a Basic Input/Output System ("APM BIOS") 110 communicates "power management events" to an APM driver 130, namely a driver module operating in association with operating system software such as WINDOWS™ 3.1X or Disk Operating System ("DOS"). A "power management event" includes various interrupt requests, external events or a System Management Interrupt ("SMI") upon detecting that the computer system is "Idle".

Upon establishing a connection with the APM BIOS 110, the APM driver 130 regularly polls the APM BIOS 110 to determine whether there are any power management events to be processed. Before powering-down the power manageable hardware devices, software applications 140a–140m and device drivers 150a–150n, preferably having the capability of processing the power management event (i.e., "APM-aware"), are notified by the APM driver 130 and asked as to whether it would be acceptable at an Application level to power-down the power manageable hardware devices 160 at this time. If so, the APM driver 130 transmits an APM message to the APM BIOS 110 to power-down all of the power manageable hardware devices 160. The add-in devices 170a–170n will not be powered down by the APM BIOS 110. Rather, it is the responsibility of their corresponding device drivers 150a–150n to manage the add-in devices 170a–170n for power management events.

Referring to FIG. 2, the conventional APM system may exist at any time in one of five power states; namely an "ON" state 200, an "APM ENABLED" state 210, a "STANDBY" state 220, a "SUSPEND" state 230 and an "OFF" state 240 which are explained in more detail in FIG. 5. The main difference between these power states is the latency needed for the computer system to power-up from its power saving states 220, 230 and 240 to the ON or APM ENABLED state 200 or 210.

As shown by transition path 225, the system enters into the SUSPEND state 230 from the APM ENABLED state 210 if one of two conditions occurs. A first condition is that the computer system undergoes a predetermined period of system inactivity (e.g., five minutes). The second condition is where a computer user intentionally selects the APM system to enter into the SUSPEND state 230. Previously, in the SUSPEND state, the CPU enters into the System Management Mode ("SMM") which can only be exited upon receiving (i) an interrupt request ("IRQ") signal indicating keyboard or mouse activity or (ii) a SMI indicating that the system should exit SMM or enter into SUSPEND state. While the system is in "SMM", the Operating System and software applications can not gain control of the CPU. It is contemplated that the SMI may be manually transmitted by providing a button on the computer system which generates the SMI when depressed.

As a result, the current configuration of the conventional APM system has a number of disadvantages. One disadvantage is that a computer system coupled to a network is unable to use of the APM system in order to reduce power consumption. The reason is that a network server periodically sends network interrupt "IRQ" queries to the computer system to determine if it is still active by receiving a response to the queries. These periodic IRQ queries precludes the CPU from entering into the SMM and thus, precludes the display monitor, hard drive and other power manageable hardware devices from entering into the SUSPEND state. As a result, power management by the conventional APM system can never be achieved as long as the computer system is coupled to the network.

Another problem associated with the current configuration is that the computer system, when in SUSPEND state, does not allow time scheduled events to occur. The reason is that these time scheduled events cannot occur is that when the CPU is in SMM, other external programs or operating systems are prevented from gaining control of the CPU. Once the system is in SMM, only the memory instructions reserved by BIOS are available. This is another mode of CPU which is used only by BIOS.

Therefore, it would be advantageous to configure an APM system to provide APM functionality for a computer system coupled to a network and to support time scheduled events during the SUSPEND state without implementation of additional hardware.

BRIEF SUMMARY OF THE INVENTION

The present invention relates to a Power Management driver employed within an APM system of a computer system including an operating system driver ("APM driver") and a Basic Input/Output System ("APM BIOS"). The Power Management driver, operating in conjunction with the operating system, intercepts APM messages intended to be transferred from the APM driver to the APM BIOS requesting power reduction (i.e., "power-down") of a plurality of power manageable hardware devices. After intercepting the APM message and determining that power manageable hardware devices are ready to be powered-down, the Power Management driver issues a number of APM acknowledgment messages to the APM BIOS to sequentially power-down the power manageable hardware devices instead of just acknowledging a previously transmitted APM message from the APM BIOS. This prevents a processor of the computer system from entering into SMM to allow the CPU to service network interrupt queries and time scheduled events.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention describes a method and system architecture for reducing power consumption by a computer system, particularly a desktop personal computer having a number of hardware devices (e.g., printer, display monitor, etc.) coupled thereto. The following detailed description is presented largely in terms of block diagrams and flowcharts which are considered to be the most effective way to convey the substance of the present invention to those persons of ordinary skill in the art of computers. The flowchart illustrates a series of steps leading to a desired result, although some well-known steps are not set forth in detail in order to avoid unnecessarily obscuring the present invention. These steps require physical manipulations of physical quantities in the form of electrical or magnetic signals capable of being stored, transferred, combined, compared or otherwise manipulated.

Figure 3:
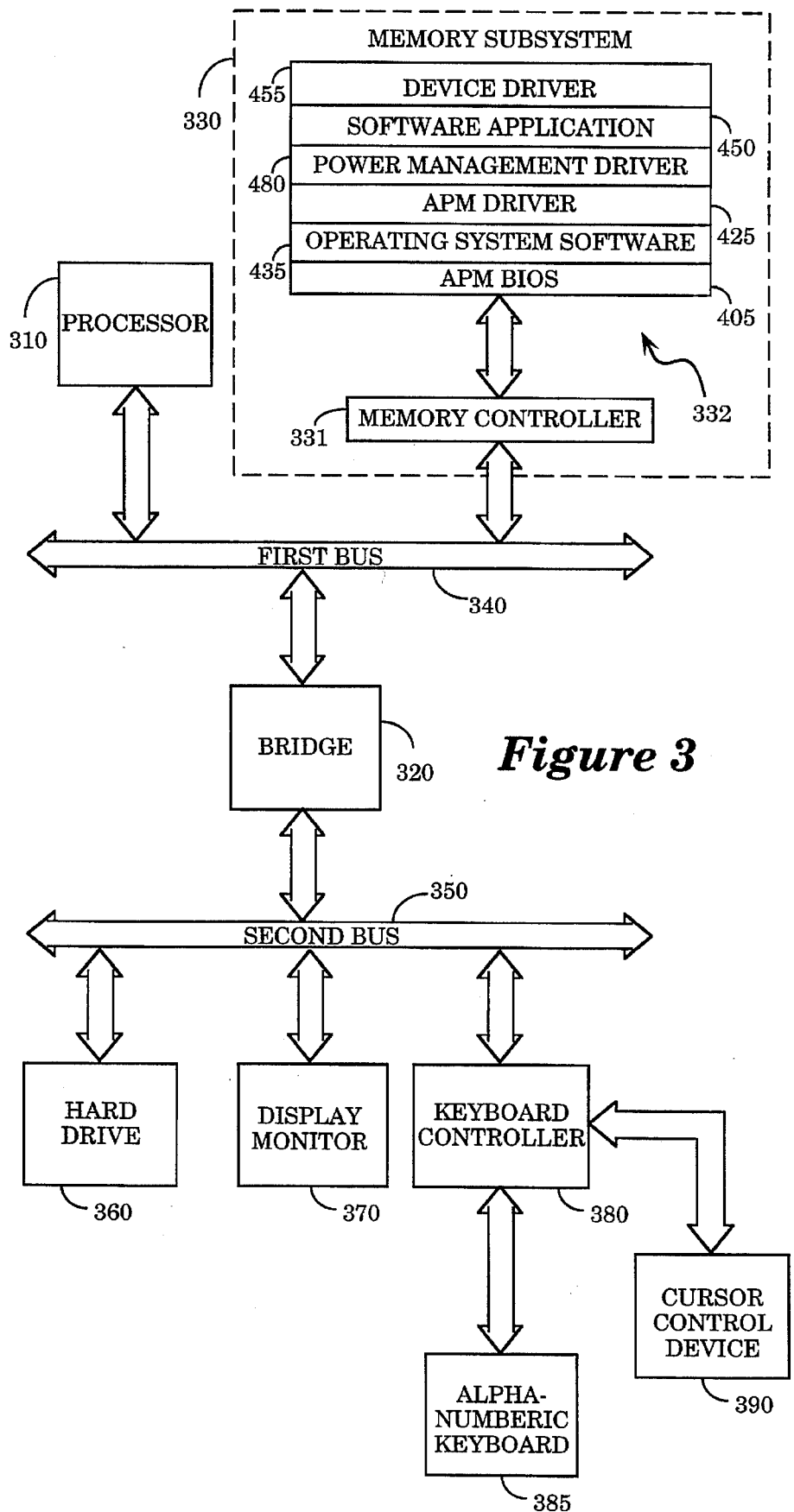
FIG. 3 illustrates a computer system including a first bus coupling a processor, a memory subsystem including memory to store a Power Management driver and a bridge providing a communication path to power manageable hardware devices coupled to a second bus.

Referring to FIG. 3, a simplified embodiment of a computer system 300 employing the present invention is illustrated. The computer system 300 comprises at least one processor 310, a bridge element 320 and a memory subsystem 330 which are coupled together through a first bus (e.g., a system bus) 340. The bridge element 320 provides a communications path between the first bus 340 and a second bus 350 such as a Peripheral Component Interconnect ("PCI") bus. A number of peripherals are coupled to the second bus 350 including a hard drive 360, a display monitor 370 and a keyboard controller 380 which controls an alphanumeric keyboard 385 and a cursor control device 390 (e.g., a mouse, track ball, touch pad, joystick, etc.).

The memory subsystem 330 includes a memory controller 331 providing an interface for controlling access to at least one memory element 332 such as dynamic random access memory ("DRAM"), read only memory ("ROM"), video random access memory ("VRAM") and the like. The memory element 332 stores information for use by the processor 310 (not shown) as well as an APM BIOS 405, Operating System software 435 (e.g., WINDOWS™ 3.1X, DOS™, etc.), an APM driver 425, a Power Management driver 480 and control software modules such as software application(s) 450 and device driver(s) 455. The APM driver 425 and the Power Management driver 480 are virtual device drivers for a WINDOWS™ 3.1X operating system or terminate and stay resident ("TSR") programs for a DOS™ operating system. These drivers contain a number of software routines to perform specific operations. For example, the Power Management driver 480, among other things, intercepts an APM message, performs analysis on the contents of the APM message and transmits APM acknowledgment messages in lieu of the intercepted APM message.

Figure 4:
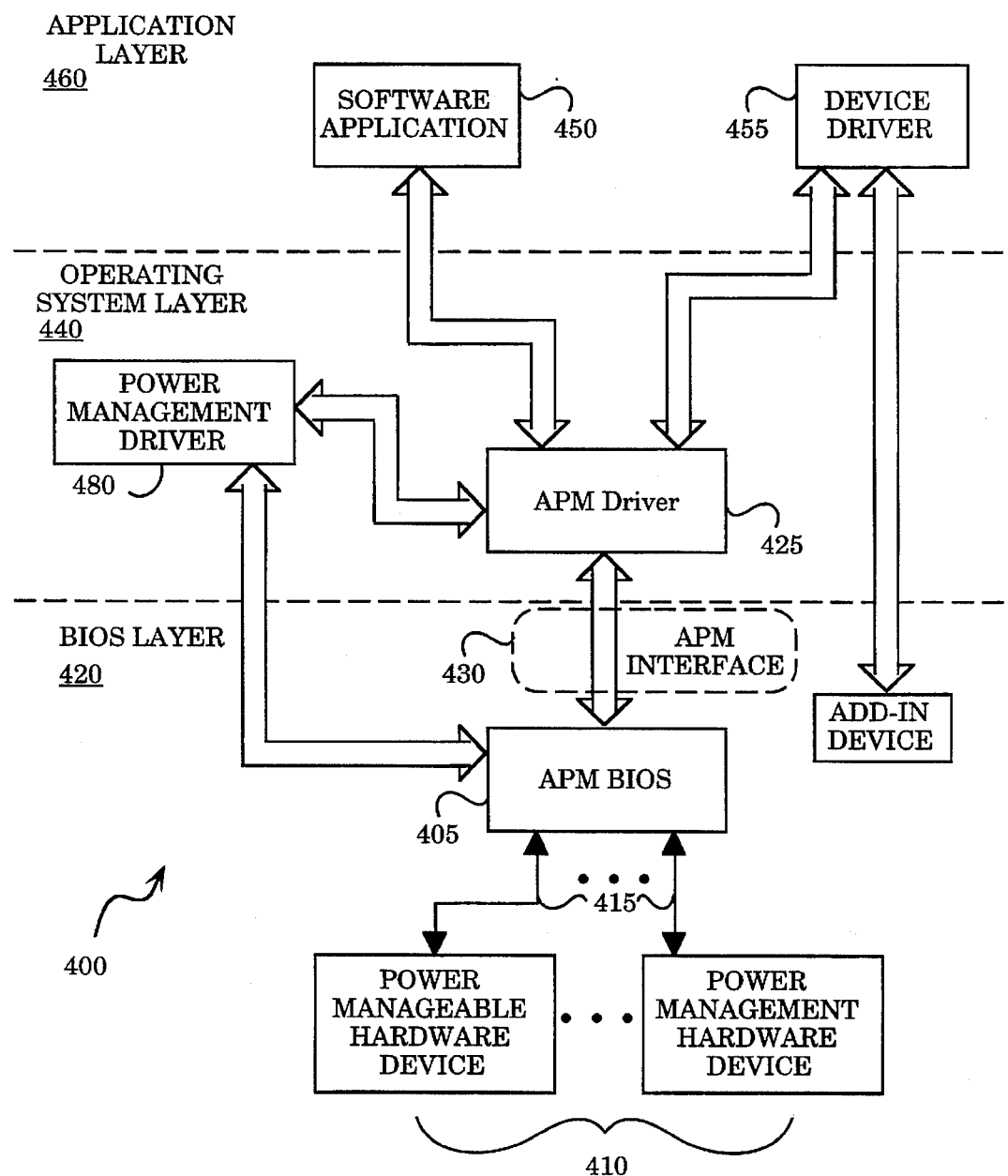
FIG. 4 illustrates an APM system including the Power Management driver employed to intercept APM messages transmitted between the APM driver and the APM BIOS to individually power-down or power-up the power manageable hardware devices.

Referring to FIG. 4, a simplified block diagram of an APM system 400 employing the present invention is shown. Similar to the conventional APM system of FIG. 1, the APM system 400 is a layered cooperative environment in which (i) the APM BIOS 405 of a BIOS layer 420, (ii) the APM driver 425 of an Operating System layer 440 and (iii) software applications 450 and device drivers 455 of an Application layer 460 operate together to reduce power consumption. It is contemplated, however, that the discussed operations of the APM system 400 could be reduced to hardware.

Well-known in the industry, the APM BIOS 405 is a software interface to a motherboard of the computer system and its resident power manageable hardware devices 410. Supplied by the original equipment manufacturer ("OEM") and specifically designed for a selected hardware platform, the APM BIOS 405 contains instructions necessary to start the computer system along with instructions for operating various hardware devices in the computer system. As shown, the APM BIOS 405 is coupled to both a set of power manageable hardware devices 410 via corresponding control lines 415 and the APM driver 425 via an APM interface 430.

The APM interface 430 establishes a protocol by which the APM BIOS transmits an APM request message to the APM driver 425 seeking performance of one of a number of power management events as listed in Table A (below). Thereafter, the APM BIOS awaits an APM acknowledgment message from the Power Management driver 480 approving performance of the requested power management event.

TABLE A

POWER MANAGEMENT EVENTS

| Name | Description |
| --- | --- |
| Standby Request Notification | This notifies the APM driver that the APM BIOS wishes to place the APM system into a Standby state. |
| Suspend Request Notification | This notifies the APM driver that the APM BIOS wishes to place the APM system into a Suspend state. It is the responsibility of the APM driver to determine whether the APM system should be placed in the Suspend state. |
| Normal Resume Notification | This indicates that the APM system wishes to resume normal operations following a Suspend. The APM driver must update the time from the real-time clock when it receives this information. |
| Critical Resume Notification | This indicates that a Critical Resume System operation occurred. This notification allows the APM driver to recover from the suspension as best it can. The APM driver updates the time from the real-time clock when it receives this notification. |
| Battery Low Notification | This informs the APM driver that the system's battery is running low. |
| Power Status Change Notification | This informs the APM driver that the system's power status has changed. |
| Update Time Notification | This informs the APM driver that the time must be updated by reading the real-time clock. |
| Critical Suspend Notification | This notifies the APM driver that the APM BIOS has detected a situation in which the system must be suspended without notification to software applications or device drivers. This notification is intended to be used by the APM driver to perform emergency shutdown actions |
| Standby Request Notification | This notifies the APM driver that the computer user wishes to place the APM system into the Standby state. |
| Suspend Request Notification | This notifies the APM driver that the computer user wishes to put the system into the Suspend state. It is the responsibility of the APM driver to determine whether the system should be placed in the Suspend state. |
| Standby Resume Notification | This indicates that the APM system wishes to resume normal operations following a Standby. The APM driver must update the time from the real-time clock when it receives this notification. |

Figure 1:
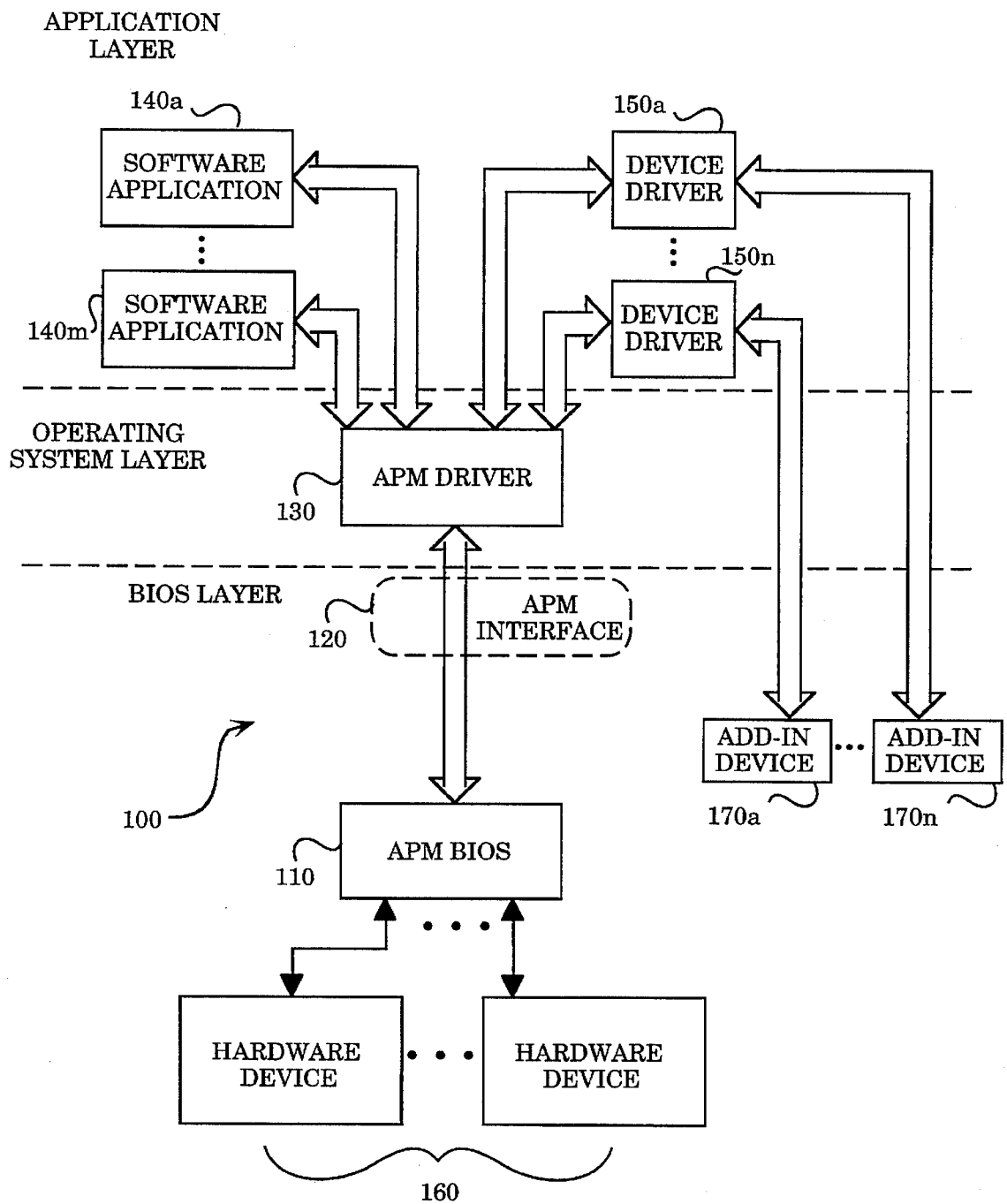
FIG. 1 illustrates a conventional APM system including an APM BIOS operating in conjunction with an APM driver to reduce power consumption by power manageable hardware devices.
Figure 2:
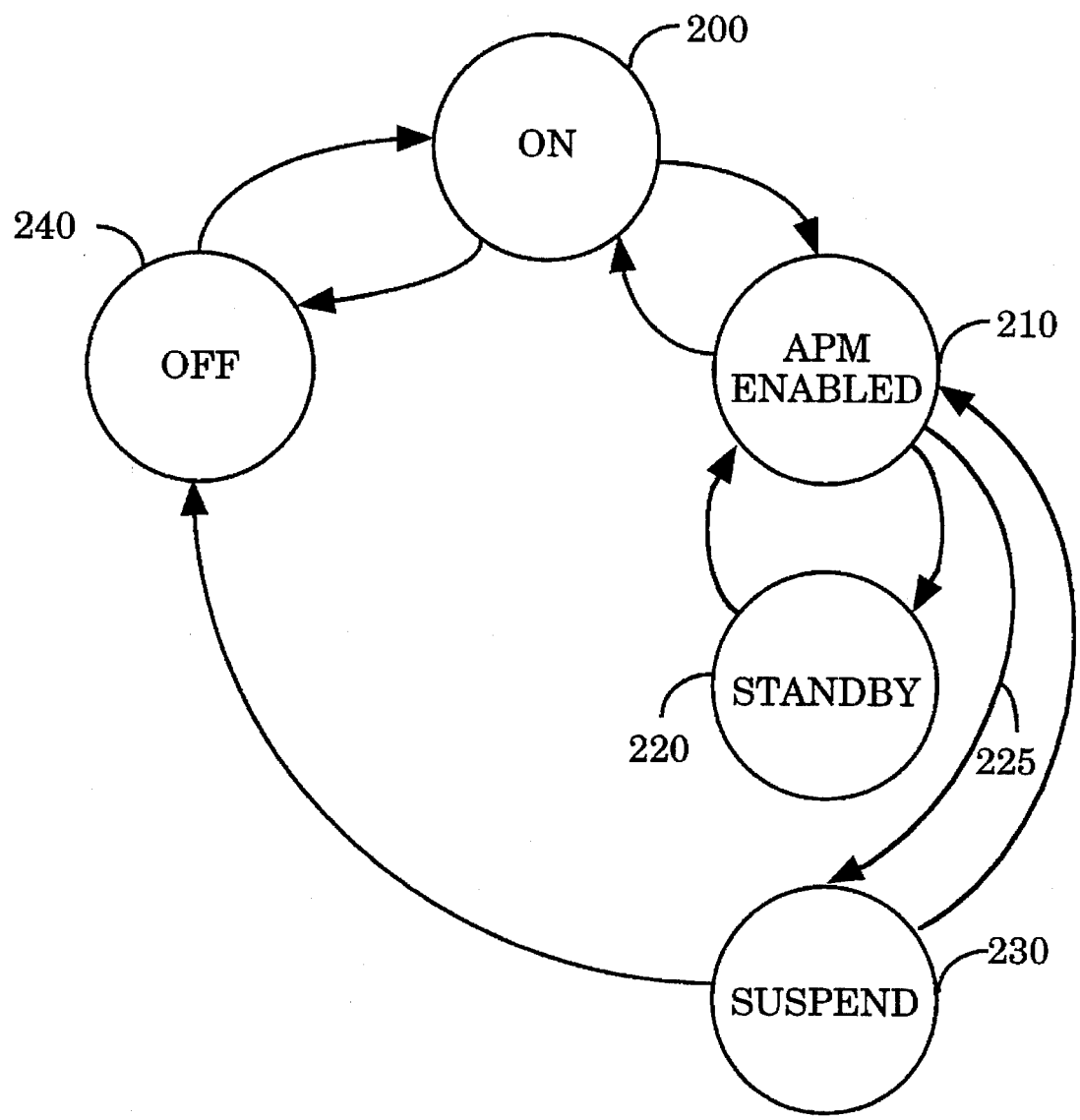
FIG. 2 illustrates a state diagram of the power states of the conventional APM system of FIG. 1.

Unlike the conventional APM system of FIG. 1, the APM system 400 uses the Power Management driver 480 to intercept an APM message produced by the APM driver 425 directed to the APM BIOS 405. This APM message indicates whether the software applications 450 and the device drivers 455, which are preferably "APM-aware", recognize the power management event. From the contents of the APM message, the Power Management driver 480 ascertains whether each and every the software application 450 and device driver 455 is willing to allow the power manageable hardware devices 410 to be powered-down. If one of the power manageable hardware devices 410 is not ready to be powered-down, the Power Management driver 480 produces an "APM reject event" message and transmits the APM reject event message to the APM BIOS 405 which would cause APM BIOS 405 not to issue a general power-down ("SUSPEND") acknowledgment to power manage the devices. This prevents the processor from entering into SMM.

Alternatively, if the power manageable hardware devices 410 are ready to be powered-down, the Power Management driver 480 calls the APM BIOS 405 to successively power-down individual hardware devices with exception to the processor. Instead, the processor is halted by the Power Management driver issuing a CPU IDLE call to the APM BIOS 405. This would allow the processor to service network interrupt queries and support time scheduled events because the HALT state allows the Operating System as well as software applications to obtain temporary control of the processor. The processor would wakeup from HALT on the timer interrupt ("IRQ0") and process Operating System's queue as well as any application to be scheduled to run. Similarly, an external event, for example a line network query, would wakeup the processor from HALT and process the interrupt thereby servicing the network query in order to maintain the network connection.

Figure 5:
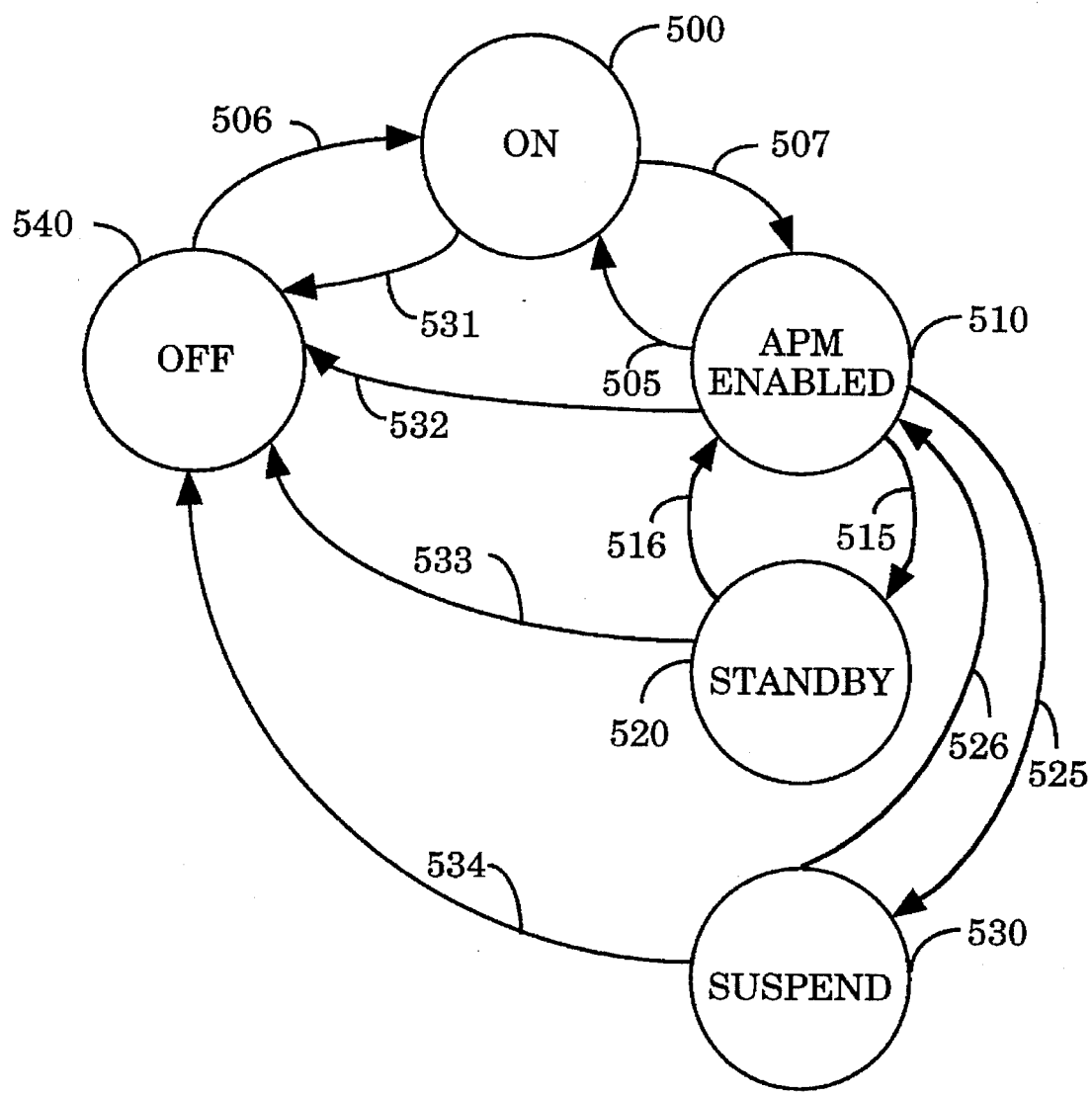
FIG. 5 illustrates a state diagram of the power states of the APM system of FIG. 3.

Referring now to FIG. 5, the computer system may exist at any time in one five power states; namely an "ON" state 500, an "APM ENABLED" state 510, an "STANDBY" state 520, an "SUSPEND" state 530 and an "OFF" state 540. Power consumption and performance are greatest in the ON state 500 and decreases with each successive above-listed state.

The ON state 500 is a default mode when the computer system is not practicing power management where APM is disabled or is initially powered-up as shown by transition paths 505 and 506, respectively. After the APM driver establishes a communication connection with the APM BIOS, the APM system enters into the APM ENABLED state 510 as denoted by transition path 507. The APM system remains in this state if the computer system is doing work even though some unused power manageable hardware devices may not be powered.

However, after a short period of system inactivity as shown by transition path 515, the APM system enters into the STANDBY state 520. This state provides the least amount of power savings but the fastest recovery to the APM ENABLED state 510 following the Power Management driver receiving an interrupt caused from movement of a cursor control device (e.g., a mouse, trackball, touch pad, joystick, etc.) or depression of a key of an alphanumeric keyboard device as denoted by transition path 516. As an example, in powering-down the display monitor under STANDBY state 520, the display monitor's horizontal sync signal is inactivated so that its display screen is blank.

The APM system enters into the SUSPEND state 530 from the APM ENABLED state 510 via transition path 525 after a relatively long period of system inactivity or through selection by the computer user. This is the state when the power-manageable hardware devices are "powered down". The SUSPEND state 530 provides more power savings than the APM Standby state 520; however, it requires a longer recovery time. Recovery from the SUSPEND state 530 to the APM ENABLED state 510 occurs after certain events such as a modem ring, a real-time clock alarm, network query, key depression and cursor control device movement as shown through transition path 526. Continuing the above example, in powering-down the display monitor under SUSPEND state, the display monitor's vertical sync signal is inactivated so that its display screen is blank.

The OFF state 540 offers the maximum power saving advantage. This state can be achieved from any of the other power states as shown by transition paths 531–534 by preferably transmitting a power-down message from the APM BIOS or removing the power cord of the computer system.

Figure 6A:
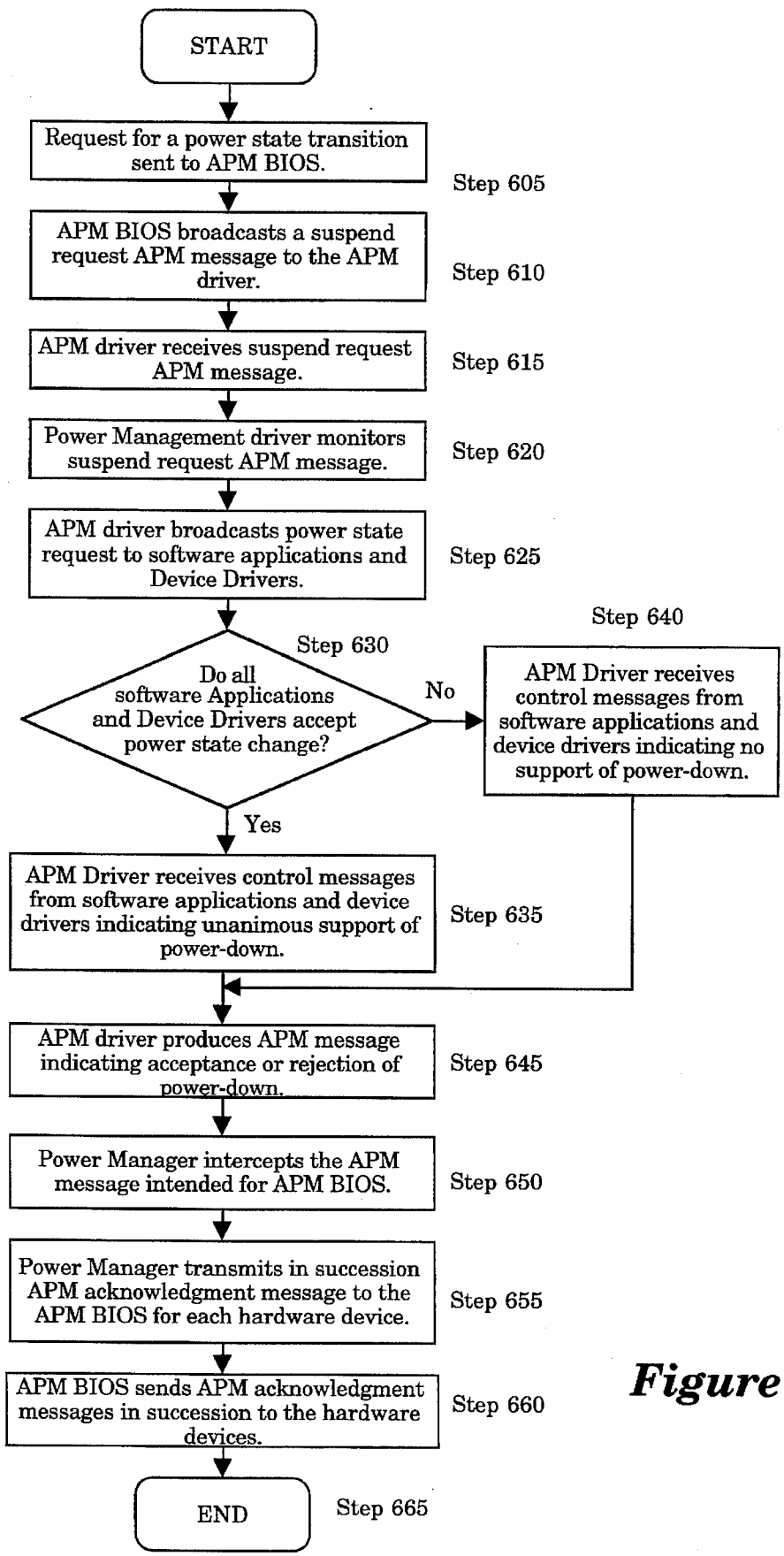
FIG. 6a and 6b are flowcharts illustrating the operations of the Power Management driver which overcomes the disadvantages associated with the APM system of FIG. 1.

As shown in FIG. 6a, a flowchart illustrating the power-down "Suspend" operation of the APM system employing the Power Management driver is shown since any power reduction transition may be performed in a similar manner. It is contemplated that the computer system has been initialized by enabling APM and allowing the software applications and device drivers to register with the APM driver after power-up. In Step 605, a power management event (e.g., a power management suspend event such as an active IDLE signal) or a user request is transmitted to the APM BIOS to request that a power state transition to "SUSPEND" state should occur. The IDLE signal is detected by the system hardware upon detecting inactivity for a predetermined period of time. The user request is through a selection of Suspend option or depression of a key entry. The Suspend key entry is defined as depressing <ctrl>, <Alt> and another key providing a viewable character simultaneously.

In Step 610, the APM BIOS detects the power management suspend event and in response transmits an APM request message (i.e., APM suspend request message) to the APM driver. In Step 615, the APM driver receives the APM suspend request message. Concurrently, the Power Management driver, monitoring the APM driver for APM suspend request messages, detects the APM suspend request message (Step 620). This step is required in order to resume from SUSPEND when a user depresses an optional button, particular to a preferred hardware configuration, which generating a SMI. This may not be required for other hardware implementations. Thereafter, the APM driver converts the APM suspend request message into a power state request in accordance with the protocol established by the operating system software, and broadcasts the power state request to software applications and device drivers via an operating system (Step 625).

Upon receiving the power state request, the software applications and device drivers separately determine whether modification of its power saving state is acceptable based on the system activity of the software applications and device drivers (Step 630). If the software applications and device driver support power-down, they will transmit control messages to the APM driver indicating such support (Step 635). Otherwise, the software applications and device drivers transmit control messages requesting the APM BIOS to disallow power-down (Step 640). The APM driver receives the control messages and produces an APM message to indicate the acceptance or rejection of power-down by the software applications and device drivers (Step 645). The Power Management driver intercepts the APM message (Step 650) and, if the software applications and device drivers are in agreement to accept the power saving state change, the Power Management driver transmits an APM acknowledgment message to the APM BIOS for each hardware device (Step 655). Next, the APM BIOS sends in succession messages to the hardware devices acknowledging the power management suspend event (Step 660). However, if all of the software applications and device drivers do not accept the power saving state change, the Power Management driver transmits the APM reject event message (not shown) to the APM BIOS in lieu of the APM acknowledgment messages. Thereafter, the "Suspend" procedure ends.

Figure 6B:
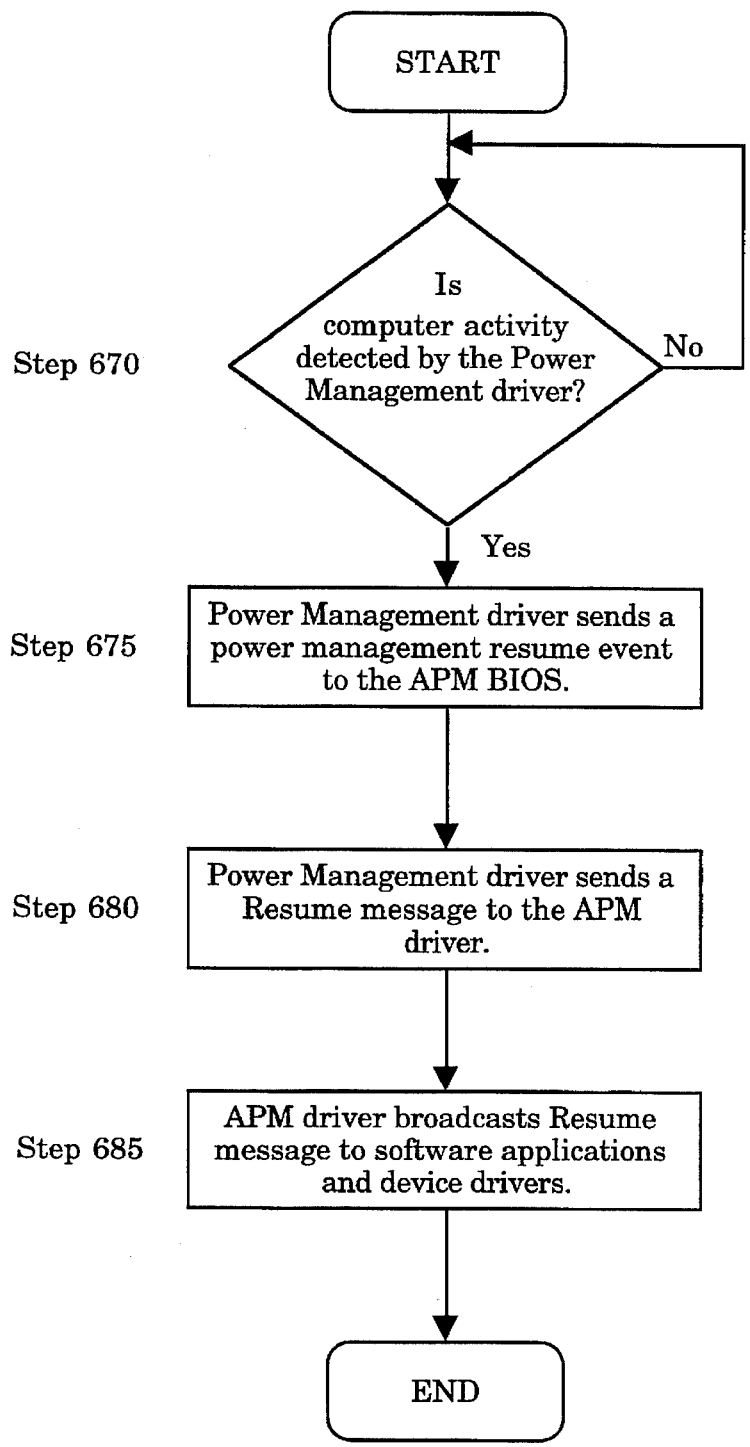

Referring now to FIG. 6b, in order to wake-up the computer system from the power-down "SUSPEND" state, the Power Management driver checks whether there is computer activity (Step 670). If not, the process continues its check at a later time. If computer activity is detected, the Power Management driver sends a power management resume event message to the APM BIOS (Step 675) to power-on the power manageable hardware devices. Next, the Power Management driver sends a Resume message to the APM driver and in response, the APM driver broadcasts the Resume message to software applications and device drivers (Steps 680 and 685) to commence operations.

The present invention described herein may be designed in many different embodiments evident to one skilled in the art than those described without departing from the spirit and scope of the present invention. The invention should, therefore be measured in terms of the claims which follow.

What is claimed is:

1. A method for managing power provided to a plurality of hardware devices of a computer system, the method comprising the steps of:

intercepting an Advanced Power Management message from an Advanced Power Management driver to a Basic Input/Output System;

analyzing the Advanced Power Management message to determine whether the plurality of hardware devices are currently allowed to be powered down in response to a power management event; and transmitting at least one Advanced Power Management acknowledgment message to said Basic Input/Output System to sequentially reduce an amount of power supplied to at least one of the plurality of hardware devices that is currently allowed to be powered down.

2. The method according to claim 1, wherein said transmitting step includes the step of transmitting an Advanced Power Management acknowledgment message to said Basic Input/Output System in order to place a processor of the computer system into a HALT state.

3. The method according to claim 2, wherein said transmitting step further includes the step of transmitting an Advanced Power Management acknowledgment message to said Basic Input/Output System in order to decrease a rotational speed of a hard drive of the computer system.

4. The method according to claim 3, wherein said transmitting step further includes the step of transmitting an Advanced Power Management acknowledgment message to said Basic Input/Output System in order to disable at least one of a pair of sync signals transmitted to a display monitor of the computer system.

5. The method according to claim 1 further comprising the step of transmitting an Advanced Power Management reject event message to said Basic Input/Output System to prevent said Basic Input/Output System from reducing said amount of power supplied to the plurality of hardware devices when the plurality of hardware devices currently are not allowed to be powered down.

6. The method according to claim 1 further comprising the step of increasing the amount of power supplied to the plurality of hardware devices after receiving a power management resume event.

7. The method according to claim 1, wherein prior to said intercepting step, the method comprises the steps of:
transmitting said power management event to the Basic Input/Output System;
transmitting an Advanced Power Management message from said Basic Input/Output System to an Advanced Power Management driver in response to said power management event;
converting said Advanced Power Management message into a power state request;
transmitting said power state request to a control software module;
transmitting a control message from said control software module to said Advanced Power Management driver, said control message indicating whether or not said control software module requires at least one of the plurality of hardware devices to be fully powered; and
converting the control message into the Advanced Power Management message to be read by the Basic Input/Output System.

8. A computer system comprising:
a first bus;
a second bus;
a bridge, coupled to said first and second buses, said bridge enables information to be exchanged between said first bus and said second bus;
a plurality of hardware devices coupled to one of said first bus and second bus; and
a memory subsystem coupled to said first bus, said memory subsystem includes a memory element which contains a Basic Input/Output System, an Advanced Power Management driver and a Power Management driver which (i) intercepts an Advanced Power Management message, (ii) analyzes said Advanced Power Management message to determine which of said plurality of hardware devices currently are allowed to be powered down in response to a power management suspend event and (iii) transmits a plurality of Advanced Power Management acknowledgment messages, corresponding to each hardware device allowed to be powered down, to said Basic Input/Output System to sequentially reduce an amount of power supplied to each hardware device allowed to be powered down.

9. The computer system according to claim 8, wherein said plurality of hardware devices includes a processor coupled to said first bus.

10. The computer system according to claim 9, wherein said plurality of hardware devices further includes a display monitor and a hard drive coupled to said second bus.

11. The computer system according to claim 10, wherein one of said plurality of Advanced Power Management acknowledgment messages to said Basic Input/Output System places said processor into a HALT state.

12. The computer system according to claim 8, wherein said Power Management driver, stored in said memory element, further transmits an Advanced Power Management reject event message to said Basic Input/Output System to prevent said Basic Input/Output System from reducing said amount of power supplied to the plurality of hardware devices when the plurality of hardware devices currently are not allowed to be powered down.

13. The computer system according to claim 12, wherein said Power Management driver, stored in said memory element, further requests said Basic Input/Output System to increase the amount of power supplied to the hardware device after receiving a power management resume event.

14. A computer system for managing power provided to a first device connected to a first bus and a second device connected to a second bus, the computer system comprising:
bridge means for enabling the at least one device connected to the first bus to communicate with the at least one device connected to the second bus, said bridge means being coupled to said first and second buses; and
memory means, coupled to the first bus, containing a Basic Input/Output System, Advanced Power Management driver and a Power Management driver, said Power Management driver includes
means for intercepting an Advanced Power Management message from said Advanced Power Management driver to said Basic Input/Output System,
means for analyzing said Advanced Power Management message to determine whether said first and second devices currently are allowed to be powered down in response to a power management event, and
means for transmitting a plurality of Advanced Power Management acknowledgment messages, corresponding to said first and second devices, to said Basic Input/Output System to sequentially reduce an amount of power supplied to said first device when allowed to be powered down and said second device when allowed to be powered down.

15. The computer system according to claim 14, wherein said Power Management driver further includes means for transmitting an Advanced Power Management reject event message to said Basic Input/Output System to prevent said Basic Input/Output System from reducing said amount of power supplied to the first and second devices when the first and second devices currently are not allowed to be powered down.

16. The computer system according to claim 14, wherein said Power Management driver further includes means for increasing the amount of power supplied to the first and second devices after receiving a power management resume event.

17. The computer system according to claim 14, wherein said means for transmitting includes a means for transmitting one of said plurality of Advanced Power Management acknowledgment messages to the first device coupled to said first bus to place the first device in a HALT state.

18. A first computer system, coupled to a network to enable data communications with a second computer system remotely located from the first computer system, comprising:
a processor; and
a memory subsystem coupled to said processor, said memory subsystem including a memory element which contains a Power Management driver that supports a time scheduled event after reducing power to said processor upon detecting inactivity of said first computer system for a predetermined period of time.

* * * * *